C. L. ORSBORN.
VACUUM BOX.
APPLICATION FILED JULY 17, 1911.
1,051,439.
Patented Jan. 28, 1913.
2 SHEETS—SHEET 2.
Fig. 4.
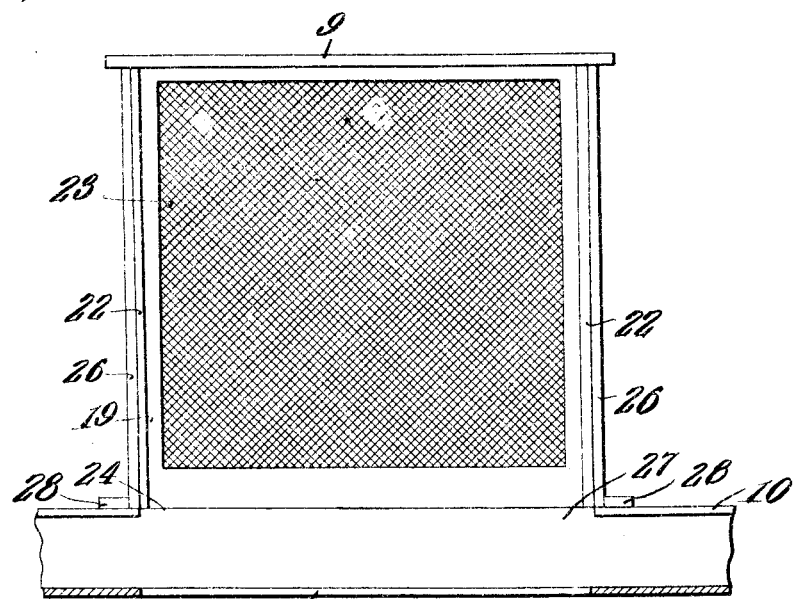
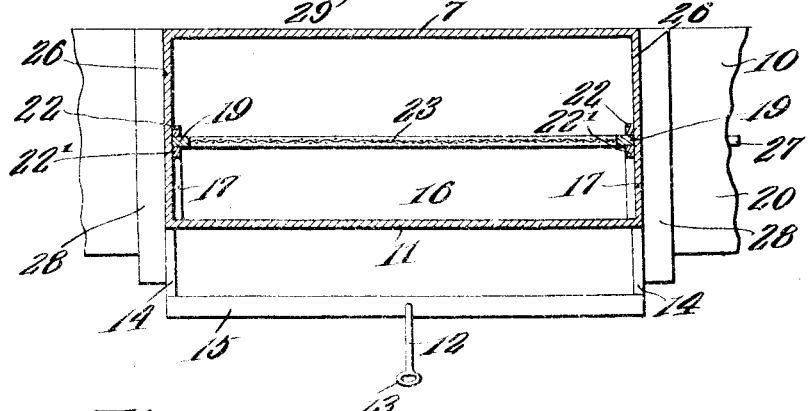
Fig. 5.
Witnesses
Calvin L. Orsborn,
Inventor
by C. A. Snow & Co.
Attorneys

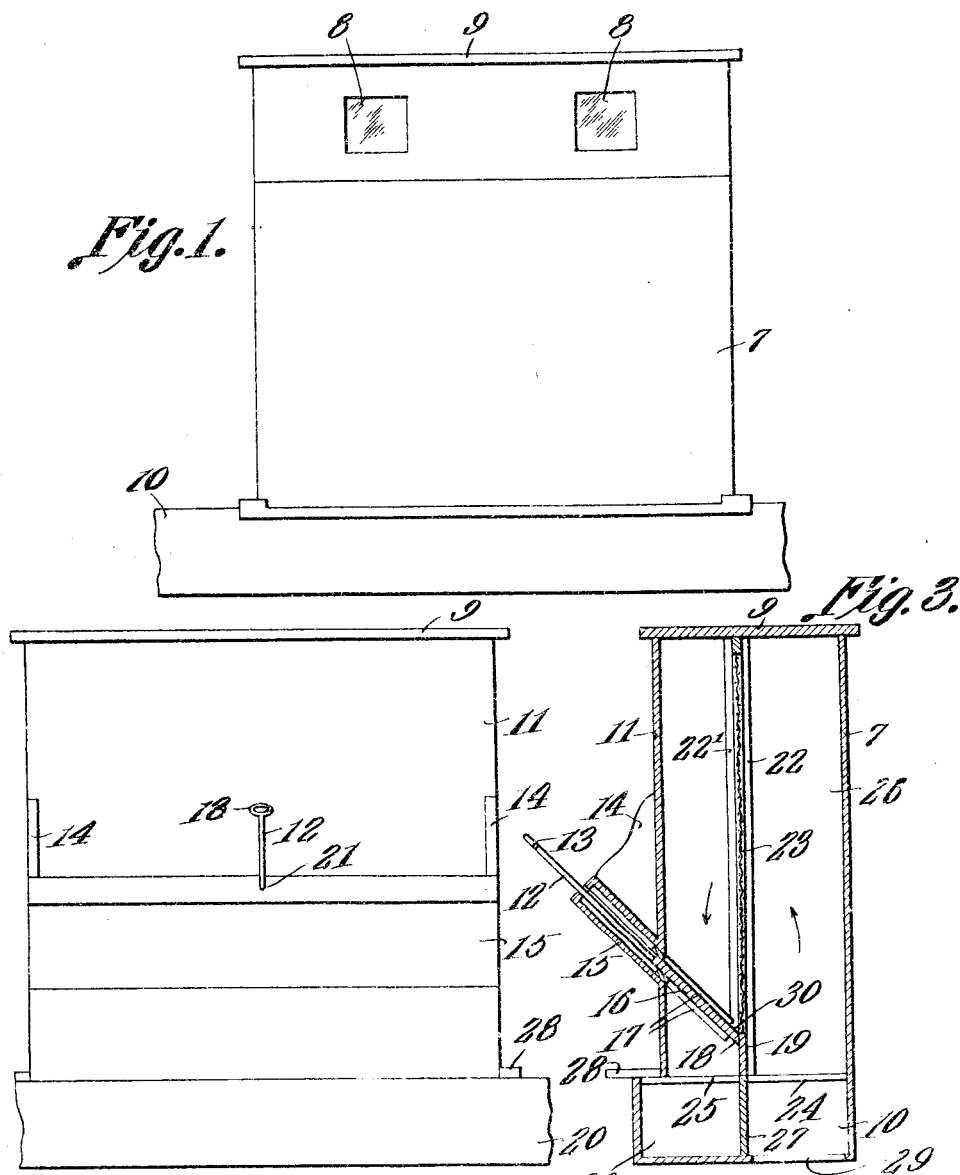

UNITED STATES PATENT OFFICE.

CALVIN L. ORSBORN, OF SELMA, ALABAMA.

VACUUM-BOX.

1,051,439.

Specification of Letters Patent. Patented Jan. 28, 1913.

Application filed July 17, 1911. Serial No. 638,967.

*To all whom it may concern:*

Be it known that I, CALVIN L. ORSBORN, a citizen of the United States, residing at Selma, in the county of Dallas and State of Alabama, have invented a new and useful Vacuum-Box, of which the following is a specification.

This invention relates to vacuum boxes used in connection with pneumatic elevators for seed cotton.

This invention has for its object to provide a vacuum box of this character attached to the trunk and air conduit to elevate the seed cotton by virtue of the air suction and retain the seed cotton in suspension until the suction through the box is shut off, whereupon the seed cotton will drop to the gin or other apparatus below the vacuum box.

It is also the object of the present invention to eliminate the possibility of the seed cotton choking to prevent its passage to the gin or the like.

A further object of the invention is to provide a vacuum box of this character which may be used in multiples and when one box becomes filled the remaining seed cotton is carried to the other boxes, and one box not having any material dependence or effect on any other box, or the remaining boxes.

It is a further object to collect the seed cotton in such a manner that the same shall not be fed to the gin until the suction is shut off through the corresponding vacuum box, and also to extend the suction to the exit passages to prevent the seed cotton from passing therethrough until the suction through the box is shut off.

This invention is embodied in a novel construction, arrangement and combination of parts as hereinafter described and as shown in the accompanying drawings, in which similar reference characters indicate similar parts, and in which:—

Figure 1 is a front elevation of the vacuum box as applied to the air conduit and trunk. Fig. 2 is a rear elevation. Fig. 3 is a transverse vertical section. Fig. 4 is a longitudinal vertical section. Fig. 5 is a horizontal section.

Referring specifically to the drawings, 10 designates a distributing conduit or trunk which communicates with a source of feed, such as a wagon or the like, and 20 designates the adjoining and parallel air conduit connected with a suction or exhaust pump of suitable character (not shown), said conduits being preferably built together with a separating partition 27. In practice, these conduits are passed over the bins and have series of devices or vacuum boxes, one above each bin, which accumulate the seed cotton which is drawn along the trunk 10 by the suction created in the conduit 20 which is made to communicate with the trunk 10 and thus feeding the seed cotton to the gin. My vacuum box comprises an upstanding casing set on the said conduits 10 and 20 over the openings 24 and 25 therein, respectively. This casing consists of end walls 26, front walls 7, rear wall 11, and a top. This casing is secured to the conduits 10 and 20 by means of a strip 28 on the ends 26. The front wall 7 has a pair of transparent portions or sight openings 8 in the upper end thereof. Vertical guide strips 22 and 22′ are secured to the inner faces of the ends 26 forming a slot or channel in line with the partition 27. The frame 19 is slid between said guides and has a screened opening 23, the screen being of suitable mesh to prevent the passage of seed cotton therethrough but permitting the passage of dust and other small particles. This frame 19 rests on the partition 27 and against the top 9, and when the casing is removed the frame can be slid out for cleaning, repair or replacement. The guides 22′, which are located on the rear side of the frame 19, are cut away at their lower ends as shown at 30. The chamber formed in front of the frame 19 is the storage chamber for the seed cotton and the chamber formed in the rear of the frame 19 is the air course chamber.

Inclined guides 17 are secured to the inner faces of each end 26 in rear of the frame 19 and forms guide slots therebetween extending from the bottom of the frame upward and rearward, and an inclined pocket 15 is secured to the rear wall 11 in line with the guides 17. Braces 14 secure the pocket 15 rigidly with the rear wall 11.

A valve 16 is slidable within the guides 17 and has the lower end thereof beveled so as to fit securely against the frame when the valve is pushed down. This valve has a stem 12 which passes through the outer end of the pocket and has a handle 13 for operating the valve.

In operation the valve 16 being retracted within the pocket 15 allows the suction to extend into the air course chamber and the seed cotton is drawn up into the storage chamber and being retarded or arrested by the screen accumulates in the storage chamber, the suction holding the seed cotton in suspension above the trunk 10. As the valve is slid downward the same fits tightly between the end walls and rear wall of the casing and the lower end of the frame 19 to close the opening into the air chamber from the air conduit and the suction being relieved allows the seed cotton which has accumulated in the storage chamber to drop down through the opening 29 in the bottom of the conduit 10 to be fed to the gin.

This vacuum box is adapted particularly for use in multiples and each or any of a series of such vacuum boxes could be operated or cut off without affecting the others, for the reason that the seed cotton is lifted into and held in suspension in the various boxes which have been opened by the suction of the air and upon the valve 16 of any vacuum box being closed the suspended seed cotton drops through the corresponding opening 29 to be fed to the respective gin. Another feature of the present vacuum box is the fact that the same may be removed from the trunk and conduits and upon the upper openings in the conduits being closed the action of any other vacuum boxes is not affected. This permits the screened frame of the vacuum box to be removed for the purpose of cleaning or repair, the screen becoming occasionally clogged with small particles of cotton which hamper the passage therethrough. When a series of these vacuum boxes are arranged on the trunk and air conduit, upon one or more of the boxes becoming filled with seed cotton, the remaining seed cotton is carried to the other boxes, and it will be noted that the air suction extending through the passages in the bottom of the trunk would prevent the seed cotton from prematurely dropping to the gin or other apparatus. When the valve 16 of the vacuum box is slid inwardly toward the lower end of the frame 19 to shut off the suction of air through the vacuum box, it will cause a waft of air to pass through the lower end of the screen to loosen the seed cotton in the storage chamber to prevent the same from choking and permitting same to readily drop to the gin or other apparatus.

This form of vacuum box has a large capacity for the storage of seed cotton, and importance is placed upon the manner in which the valve is inserted and operated. The inclined position of the valve forms a convenient manner for closing the opening between the feed course chamber and the conduit and also provides for the convenient removal of the valve by a downward movement thereof out of the guide 17.

The important feature of the present invention is the fact that the seed cotton is elevated and accumulated in the storage chamber above the seed cotton trunk in a predetermined quantity and is solely retained in suspension by the suction of the air, whereby upon the suction of the air being cut off, the accumulated and suspended seed cotton is delivered through the trunk *in toto* solely by cutting off the suction.

Having described my invention what I claim as new is:—

1. In combination with a seed cotton trunk and an adjoining air suction conduit each having an upper opening therein and the cotton trunk having a lower opening therein, of a casing set over the openings and having a vertical screen therein forming an air course chamber and a storage chamber communicating respectively with the air conduit and trunk, in order that the air suction elevates and accumulates the seed cotton in a quantity in the storage chamber and solely retains same in suspension therein, and a valve for cutting off the communication between the air course chamber and the conduit whereby the accumulated and suspended seed cotton is delivered *in toto* through the upper and lower openings in the trunk, solely by cutting off the suction.

2. In combination with a seed cotton trunk and an air suction conduit, of a casing having a vertical screen therein forming an air course chamber and a storage chamber communicating respectively with the air conduit and trunk, in order that the air suction elevates and accumulates the seed cotton in a quantity in the storage chamber and solely retains same in suspension therein, and a valve for cutting off the communication between the air course chamber and the conduit whereby the accumulated and suspended seed cotton is delivered *in toto* through the trunk solely by cutting off the suction.

3. In combination with a seed cotton trunk and an air suction conduit, of means whereby the air suction elevates and accumulates the seed cotton in a quantity above the trunk and solely retains the same in suspension, and means for cutting off the suction of air whereby the accumulated and suspended seed cotton is delivered *in toto* solely by cutting off the suction.

4. In combination with a seed cotton trunk and an air suction conduit, of a casing above the trunk having a storage chamber communicating with the trunk and having an air course chamber communicating with the conduit and with the storage chamber, whereby the seed cotton is elevated and accumulated in a predetermined quantity in the stoarge chamber and is solely retained in suspension in the storage chamber by the suction of the air, and a valve for cutting off the communication between the air course chamber and the conduit whereby the accumulated and suspended seed cotton is delivered through the trunk *in toto* solely by cutting off the suction.

In testimony that I claim the foregoing as my own, I have hereto affixed my signature in the presence of two witnesses.

CALVIN L. ORSBORN.

Witnesses:
 NELL A. KERR,
 J. A. FULLER.